United States Patent [19]
Otto

[11] 3,858,067
[45] Dec. 31, 1974

[54] DYNAMOELECTRIC MACHINE

[75] Inventor: Charles W. Otto, De Kalb, Ill.

[73] Assignee: General Electric Company, Fort Wayne, Ind.

[22] Filed: May 9, 1973

[21] Appl. No.: 358,589

Related U.S. Application Data

[62] Division of Ser. No. 246,219, April 21, 1972, abandoned.

[52] U.S. Cl................. 310/42, 310/91, 310/258, 29/474.4
[51] Int. Cl. .......................................... H02k 15/00
[58] Field of Search............ 310/88, 85, 89, 90, 91, 310/254, 42, 258, 259, 71; 29/596, 605, 474.4; 200/179; 174/52; 248/14, 19

[56] References Cited
UNITED STATES PATENTS

| | | | |
|---|---|---|---|
| 598,540 | 2/1898 | Soames | 310/42 |
| 3,048,104 | 8/1962 | Riggs | 29/474.4 |
| 3,145,313 | 8/1964 | Tupper | 310/90 |
| 3,300,666 | 1/1967 | Frazier | 310/42 |
| 3,313,967 | 4/1967 | Ross | 310/254 |
| 3,484,934 | 12/1969 | Wightman | 310/42 |
| 3,512,024 | 5/1970 | Papa | 310/88 |
| 3,705,994 | 12/1972 | Berry | 310/91 |

*Primary Examiner*—R. Skudy
*Attorney, Agent, or Firm*—John M. Stoudt

[57] ABSTRACT

A dynamoelectric machine is provided with a stator having windings therein, a rotatable assembly disposed in the stator, and at least one end shield for supporting the rotatable assembly. A plurality of beams on the stator respectively have at least a portion for mounting with the end shield, and a plurality of sockets are provided in the end shield for receiving the beam portions and into which they extend generally in spaced relation with at least a portion of the end shield about the sockets. Metallic plugs are solidified and contained generally within the sockets and are respectively interconnected between the beam portions and at least a portion of the sockets for rigidly mounting the end shield and the stator.

23 Claims, 8 Drawing Figures

3,858,067
SHEET 1 OF 3
FIG.1
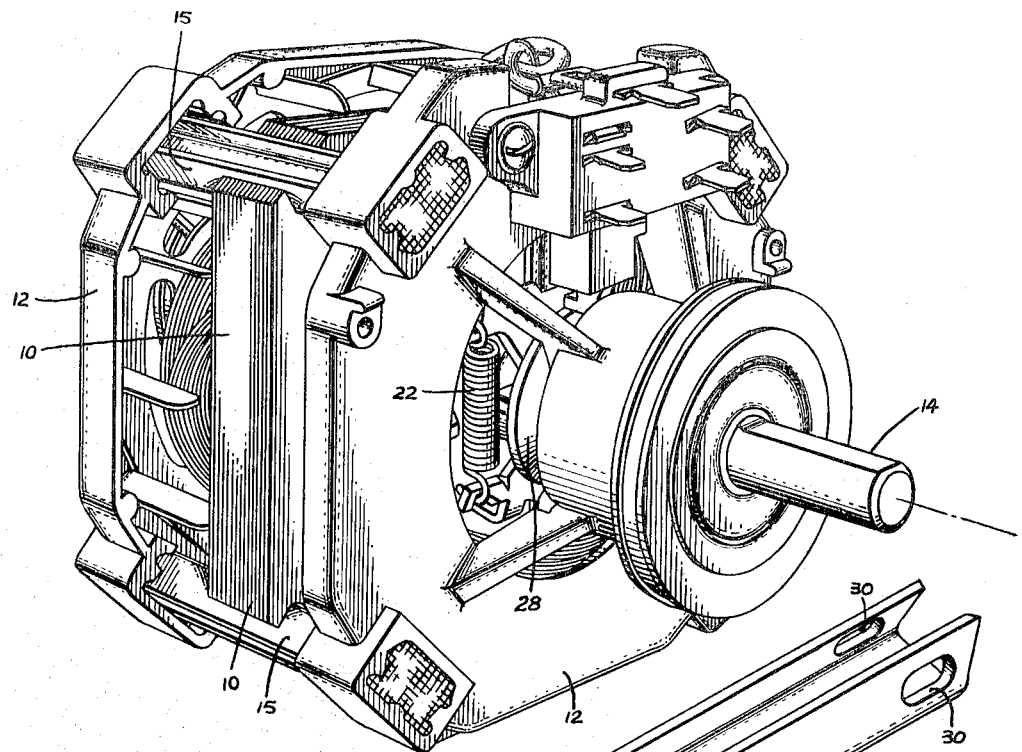
FIG.2
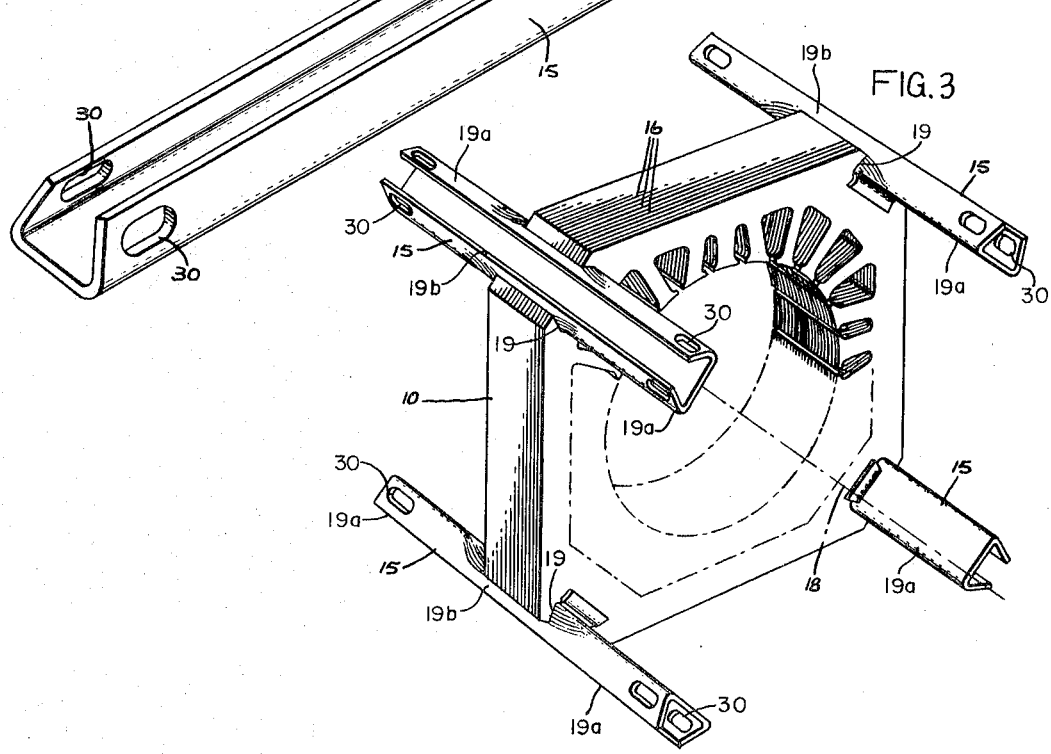
FIG.3

DYNAMOELECTRIC MACHINE

CROSS REFERENCE TO RELATED APPLICATION

This is a division of my copending application Ser. No. 246,219, filed Apr. 21, 1972, now abandoned.

BACKGROUND OF THE INVENTION

This invention relates generally to dynamoelectric machines and in particular means for mounting an end shield with a stator of such machines.

As is well-known in the dynamoelectric machine art, most electric motors and generators comprise a stationary member generally referred to as a stator in which a rotatable member generally referred to as a rotor is rotatably mounted. Typically, the stator comprises a laminated magnetic core having a cylindrical bore in which the rotor resides, and opposite end shields are secured adjacent opposite ends or sides of the stator. A bearing is carried by each of the two end shields through which a rotor drive shaft is journalled.

In dynamoelectric machines of the type just described, it is most important that the rotor and stator be assembled during manufacture in proper radial and axial alignment, and that such be done expeditiously and inexpensively. Improper radial alignment results in eccentricity in the annular air gap between the rotor and magnetic core while improper axial alignment produces axial rotor thrust. It is also important that the bearings carried by the two end shields be mutually aligned for bearing longevity.

There has heretofore, existed, of course, several different methods of assembling dynamoelectric machines with the machine rotor properly positioned within the stator core and with the rotor supporting bearings mutually aligned along a common axis. For example, stator components have been bolted to bearing carrying motor frame members through which bearings the rotor was journalled. Proper radial alignment here is achieved principally through the use of close tolerances during machining of assembly members. In other words, proper alignment results from close adherance to dimensional assembly specifications rather than from empirical observation and adjustment. With such methods the tighter the tolerances are held the more accurate the resulting alignment. Unfortunately, the tighter the tolerances the greater also is the cost of assembly.

Another method of assembling stator and rotor has been one in which an oversized rotor simulator is used, which simulator subsequently is substituted by an actual rotor after alignment between rotor and stator is achieved. Such use of simulator rotors, however, has been limited to "unit bearing" type machines, that is to say dynamoelectric machines in which the rotor is supported at one end only. Thus, such methods have been unavailable for use with the great majority of dynamoelectric machines wherein the rotor is supported at both ends of the rotor shaft.

In 1965 U.S. Pat. No. 3,165,816 issued to P. W. Thompson and titled "Method of Manufacturing Dynamoelectric Machines" which disclosed a new approach to assembling dynamoelectric machines. Here, removable positioning means such as shims are arranged in the air gap between rotor and stator core. Two bearing supports are positioned adjacent a surface of other stator members including the magnetic core and then bonded together with an adhesive bonding material such as a thermosetting resin thereby securing the stator assemblies together upon curing of the adhesive and removal of the positioning means. Though this method has yielded good alignment without the expense necessitated by maintenance of very close tolerances the problems generally associated with the use of adhesives have, of course, been present.

SUMMARY OF THE INVENTION

Among the several objects of the invention may be noted the provision of a dynamoelectric machine which overcomes the disadvantageous or undesirable features discussed hereinbefore, as well as others, with respect to the prior art; the provision of such dynamoelectric machine in which at least one end shield and at least a portion of a stator are mounted together by metallic means; the provision of such dynamoelectric machine in which the metallic means forms a shrink-fit engagement between the stator portion and the one end shield to interconnect them against relative displacement; the provision of such dynameoelectric machine wherein the metallic means is solidified upon cooling thereof and contained generally with the one end shield; the provision of such dynamoelectric machine in which the stator portions and the one end shield are respectively provided with means at least partially enveloped by the metallic means upon solidification thereof to prevent relative displacement of the stator portion and the one end shield portion; the provision of such dynamoelectric machine in which the stator portion and the one end shield are respectively provided with means grippingly engaged by the metallic means upon the cooling thereof for preventing relative displacement of the stator portion and the one end shield; the provision of such dynamoelectric machine in which the one end shield has means for containing the metallic means and into which the stator portion extends; the provision of such dynamoelectric machine in which the stator and at least the one end shield are maintained in mutual alignment for rotatably mounting a rotatable assembly of such dynamoelectric machine; and the provision of such dynamoelectric machine which is simplistic in design, economical to manufacture, and easily assembled. Other objects and advantageous features of the present invention will be in part apparent and in part pointed out hereinafter.

In general and in one form of the invention a dynamoelectric machine has a stator having winding means therein. A rotatable assembly is disposed within the stator, and at least one end shield supports the rotatable assembly. A plurality of means on the stator respectively have at least a portion for mounting with the end shield, and means is provided in the end shield for receiving the mounting means portions and into which they extend generally in spaced relation with at least a portion of the end shield about the receiving means. Metallic means are solidified and contained generally within the receiving means and respectively interconnected between the mounting means portions and at least a portion of the receiving means for rigidly mounting the end shield and the stator.

Also in general and in one form of the invention, a dynamoelectric machine is provided with a stator having winding means therein, a rotatable assembly disposed in the stator, and at least one end shield for supporting the rotatable assembly. A plurality of generally elongate beams have portions mounted in displacement preventing engagement to the stator and free end portions for mounting engagement to the one end shield. A plurality of sockets are provided in the one end shield for receiving the free end portions of the beam and into which they extend generally in spaced relation with the one end shield disposed about the sockets. A plurality of metallic plugs are solidified and contained generally within the sockets in mounting engagement between the free ends of the beams and the one end frame. Means integral with the one end frame extends generally from a side wall of the sockets toward the free end portion of the beams for shrink-fitting engagement with the metallic plugs upon the solidification thereof within the sockets to prevent relative displacement of the one end frame. Other means are also provided on the free end portions of the beams for shrink-fitting engagement with the metal plugs upon the solidification thereof to prevent relative displacement of the beams.

BRIEF DESCRIPTION OF THE DRAWING

FIG. 1 is a perspective view of an electric motor embodying principles of the present invention;

FIG. 2 is a perspective view of a beam member of the electric motor shown in FIG. 1;

FIG. 3 is a perspective view of four of the beam members shown in FIG. 2 rigidly mounted to a magnetic core member of the electric motor shown in FIG. 1;

Corresponding reference characters indicate corresponding parts throughout the several views of the drawings.

Figure 4:
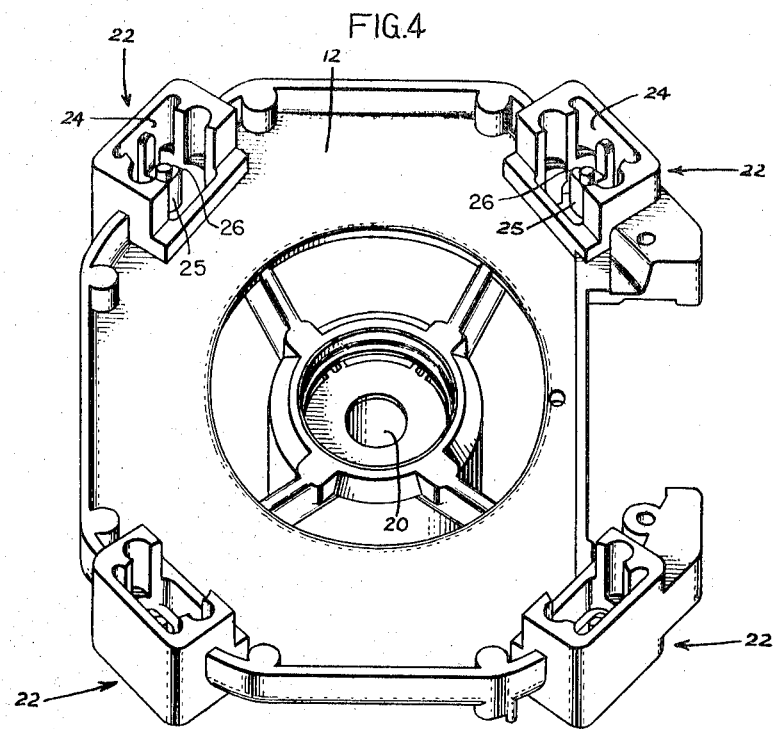
FIG. 4 is a perspective view of an end shield member of the electric motor shown in FIG. 1.

The following examples illustrate the invention and are not to be construed as limiting in any manner.

DESCRIPTION OF THE PREFERRED EMBODIMENT

Referring now in more detail to the drawing, there is shown in FIG. 1 a dynamoelectric machine, such as an electric motor, having a laminated stator core 10 and two rotor bearing carrying end shields 12 through which bearings a rotor shaft 14 is journalled. Four mounting means, such as an elongate or generally U-shaped beams 15, are rigidly mounted to the core and to the two end shields thereby rigidly securing these stator components together with a rotor connected with rotor shaft 14 and rotatably disposed within core 10. The rotor and rotor shaft generally constituting a rotatable assembly for the dynamoelectric machine.

With particular reference now to FIGS. 2 and 3, the stator core and beam assembly, may be seen in greater detail. In forming the core and beam assembly a plurality of magnetic laminations 16 are first juxtaposed to form a stack and then secured together as by the use of keys. The core 10 has a cylindrical bore having a bore axis 18 in which bore a rotor may subsequently be mounted for rotation with respect to the core and with the rotor axis being substantially coincident with bore axis 18. The outer peripheral surface of the laminated core has four grooves 19 communicating between opposite side faces of the core. U-shaped beams 15 are positioned within the grooves 19 with beam portions 19a projecting from each of the opposite faces of the core and with a beam portion 19b intermediate the projecting portions residing within the grooves. The beams 15 are then rigidly secured to the core 10 as by press fitting, which may be accomplished by flattening a precrimped web portion of the U-shaped beam 15 thereby separating the elongated flange portions projecting therefrom. This action presses the beam flanges tightly against the confronting side walls of grooves 19.

Referring now to FIG. 4, end shield 12, which preferably is composed of a die cast aluminum alloy such as commercial A 380, may be seen to support a bearing 20 through which rotor shaft 14 may be journalled. The end shield 12 further includes means for receiving beams 15 which extend thereinto, such as four sockets 22 from an inner wall 24 of which a socket stud 25 projects towards bearing 20 and toward the beams to bifurcate portions of the sockets. Each of the resulting U-shaped passageways through the end shield is of sufficient size to accommodate one of the U-shaped beams, beam projecting portions 19a preferably with no portions of either the sockets or beams in mutual contact. Projections, such as knobs or cross members 26 or the like, are integrally formed on studs 25.

Figure 5:
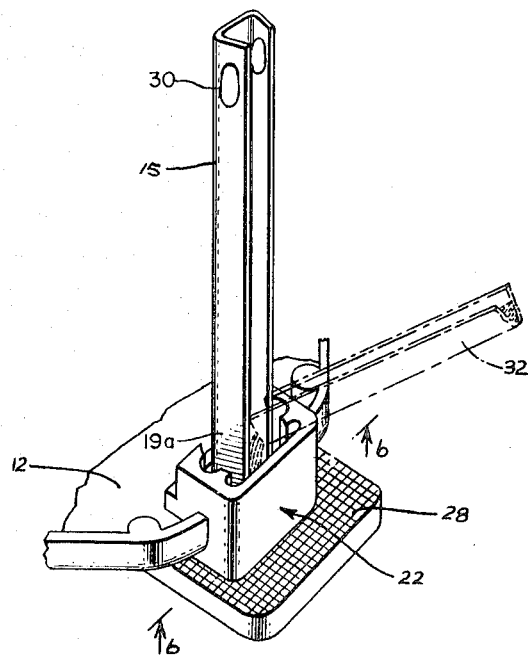
FIG. 5 is a perspective view of a fragment of the end shield shown in FIG. 4 with a portion of one of the beam members shown in FIG. 3 positioned in an end shield socket and with molten metal being poured into the socket to ridigly secure the beam to the end shield.

Referring next to FIGS. 5-8 a preferred method of rigidly securing the beam projecting portions 19a within the end shield sockets 22 is illustrated. First, the motor rotor is radially positioned within the magnetic core 10 as with the use of removable positioning shims not known. The end shield 12 is mounted to a fixture with asbestos pads 28 spring biased flush against the bottom of the sockets 22 as shown in FIG. 5. The magnetic core, beam and rotor assembly is then secured to the fixture above the end shield with each of the beam projecting portions 19a positioned within a mating socket 22 and with the rotor shaft 12 journalled through the end shield bearing 20. Each beam 15 is inserted well into the mating socket 22 to terminate just short of one end thereof or the surface of the asbestos pad 28 with no contact being made therewith or with the inner walls 24 of the socket or with the socket stud 25. Two confronting apertures 30 within the two flanges of the beam projecting portions are thereby positioned about opposite sides of socket stud 25. In this position an air gap indicated generally at G, exists between the beam projecting portions 19a residing within the sockets 22 and with the socket walls 24 and studs and 25.

Next, slugs of zinc die casting alloy, preferably Zamak No. 3 currently offered for sale by the New Jersey Zinc Company of Gloucester City, New Jersey, which carries the ASTM designation of B240, alloy AG40A, are measured in volumetric relation to the air gap G within the sockets 22. Numerous other metals or metal alloys may, of course, also be used, such as lead or aluminum. The metal or metallic alloy should, however, have a melting point below that of the end shield itself. Preferably, the quantity selected should be sufficient to fill the socket 22 from the closed end thereof, i.e., from the asbestos pads, to a point significantly above or substantially enveloping the socket stud 25.

Figure 6:
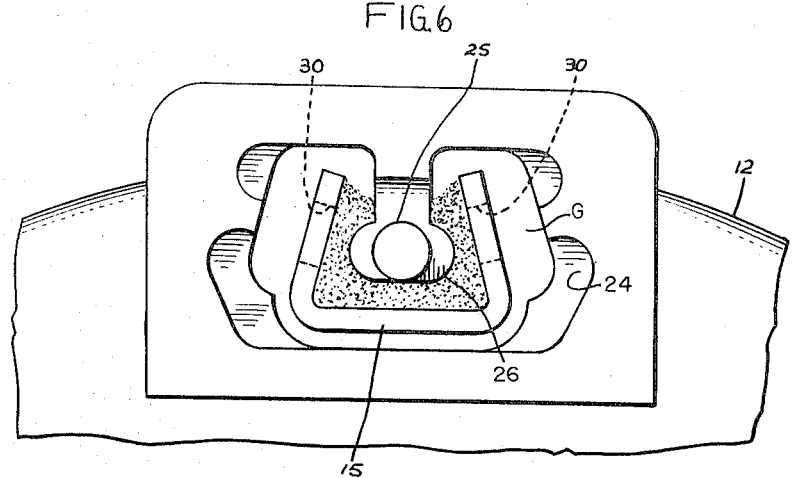
FIGS. 6, 7 and 8 are sequential plan views of the apparatus shown in FIG. 5 taken along line 6—6 with the flow chute and molten metal flowing thereout adjacent the chute lip removed for clarity.
Figure 7:
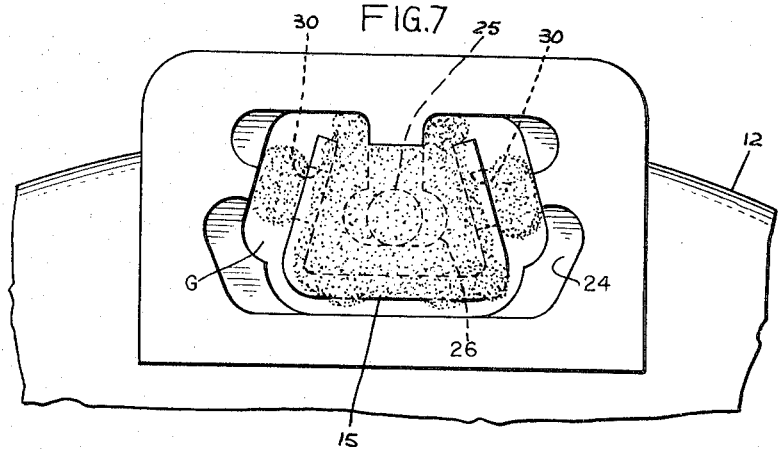
Figure 8:
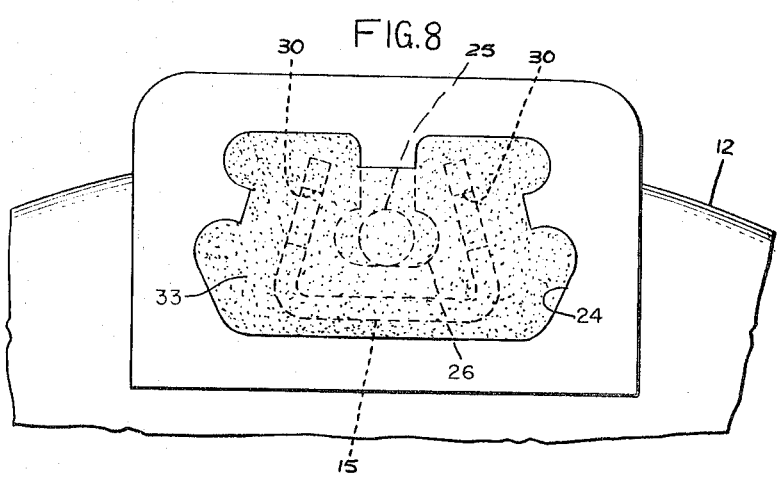

Next, the measured slugs are melted as by induction heating. The melted zinc alloy is then poured from ceramic chute 32, as shown in phantom lines in FIG. 5, into the U-shaped beams just above the top of sockets 22. As seen in FIG. 6, the molten alloy flows downwardly within the U-shaped beams towards the asbestos pads 28. As it reaches the bottom of the socket 22, it spreads laterally through apertures 30 and out from under the terminus of the beam projecting portions as shown in FIG. 7. The molten metal then flows into contact with the inner walls 24 of the socket completely enveloping socket 22 substantially studs 25. Within a couple of seconds or so the molten zinc alloy cools and solidifies within the socket 22 thereby to form metallic means, such as plugs 33, which are interconnected between at least part of the beam end 19a and studs 25, as discussed hereinafter.

The assembly is now inverted and placed over a second end shield with the rotor shaft journalled through the bearing of the second end shield and with the beams disposed within mating end shield sockets. Thrust collars secured to the shaft about each face of the core engages an end shield ring member to insure proper axial alignment of the rotor within the core. The molten zinc alloy is then poured into the sockets of the second end shield in which the protruding portions of the other ends of the beam reside in the same manner as previously described. The action rigidly secures the second end shield to the beams with the rotor properly positioned therebetween, both axially and radially. The radial positioning shims are then removed and the assembled motor lifted from the spring biased asbestos pads and removed from the fixture.

The assembly of machne cores 10 to end shields 12 by the use of molten metal introduced into end shield sockets 22 in which portions 19a of beams 15 extending from the core are received offers numerous advantages over prior art assembly methods and dynamoelectric machines such as those previously described. Radial alignment between the stator and rotor is performed by actually journalling the rotor shaft through the bearings supported or carried by the end shield. This inhibits misalignment between rotor bearings and between rotor and core from arising during subsequent stator component assembly. The use of molten metal negates any need for the use of adhesives such as epoxies and resins which are difficult to handle since they frequently are toxic and have relative long curing times even at elevated temperatures. Some quick curing epoxies are commercially available but their high curing speed inofitself presents additional handling problems. Furthermore, with adhesives the adhering surfaces must be first cleaned. The use of molten metals or alloys avoids these problems by acting more in the nature of a plug than as an adhesive. The metallic plug also provides better electrical connection between the core and end shield than do adhesives.

By forming the plug 33 completely about the socket stud 25 and the apertured beam 15 relative movement therebetween is inhibited omnidirectionally. In effect, an interlock or interconnection is created when the molten metal solidifies. As solidification occurs, the metal shrinks about the projecting stud 25 and projection 26 thereof to form a tight grip or shrink fit thereon. Thus, the inherent shrinking action of the solidifying molten metal is itself capitalized upon in securing the beams 15 within the sockets 15. The U-shape of the beams 15 themselves provides both a channel through which the molten metal is guided into the socket and radial rigidity to the stator 10 as a whole. Dissembly is also facilitated insomuch as such may be performed by merely heating the sockets till the plugs melt.

It should, of course, be understood that the just described embodiment and method merely illustrates principles of the invention. Many modifications may, of course, be made thereto without departure from the spirit and scope of the invention as set forth in the following claims.

What I claim as new and desire to secure by Letters Patent of the United States is:

1. A dynamoelectric machine comprising a stator having winding means therein, a rotatable assembly disposed in the stator, at least one end shield for supporting the rotatable assembly; a plurality of means on the stator respectively having at least a portion for mounting with the end shield, means in the end shield for receiving the mounting means portions and into which they extend generally in spaced relation with at least a portion of the end shield about the receiving means, and metallic means solidified and contained generally within the receiving means and respectively interconnected between the mounting means portions and at least a portion of the receiving means for rigidly mounting the end shield and the stator.

2. A dynamoelectric machine as set forth in claim 2, wherein said end shield is metal, the metal of said metallic means having a melting point less than that of said end shield.

3. A dynamoelectric machine as set forth in claim 1, wherein said metallic means effects a shrink-fit engagement between said mounting means portions and said receiving means portions.

4. A dynamoelectric machine as set forth in claim 1, wherein said receiving means portions extend generally toward said mounting means portions, and said metallic means at least partially enveloping said receiving means portions.

5. A dynamoelectric machine as set forth in claim 4, wherein said receiving means portion is integral with said receiving means.

6. A dynamoelectric machine as set forth in claim 1, wherein said receiving means portions include means projecting therefrom for envelopment at least in part by said metallic means.

7. A dynamoelectric machine as set forth in claim 1, wherein said receiving means comprise a plurality of sockets in said end shield, said mounting means portions extending at least partially into said sockets, respectively.

8. A dynamoelectric machine as set forth in claim 7, wherein said sockets are generally open ended, said metallic means generally filling said sockets.

9. A dynamoelectric machine as set forth in claim 7, wherein said receiving means portion extend generally from a side wall of said sockets, respectively.

10. A dynamoelectric machine as set forth in claim 9, wherein said receiving means portions respectively comprise means connected with said side walls of said sockets for projecting therefrom generally toward said mounting means portion, and means on said means for interconnecting engagement with said metallic means.

11. A dynamoelectric machine as set forth in claim 1, comprising means on said mounting means portions for interconnecting with said metallic means to prevent displacement of said mounting means portions from said receiving means, respectively.

12. A dynamoelectric machine as set forth in claim 11, wherein said interconnecting means comprises at least one aperture extending through said mounting means portion.

13. A dynamoelectric machine as set forth in claim 1, wherein said mounting means portions and said receiving means are predeterminately spaced from each other providing a gap therebetween, said gap being generally filled by said metallic means.

14. A dynamoelectric machine as set forth in claim 1, wherein said mounting means are disposed in displacement preventing engagement with said stator.

15. A dynamoelectric machine as set forth in claim 1, wherein said mounting means comprise a plurality of elongate beams having free end portions which generally constitute said mounting means portions.

16. A dynamoelectric machine as set forth in claim 15, wherein said elongate beams comprise other portions connected in displacement preventing engagement with said stator.

17. A dynamoelectric machine as set forth in claim 15, wherein said free end portions include means for interconnecting with said metallic means thereby to prevent displacement of said elongate beams from said receiving means, respectively.

18. A dynamoelectric machine as set forth in claim 17, wherein said interconnecting means comprise at least one opening extending through said free end portions, respectively.

19. A dynamoelectric machine as set forth in claim 15, wherein said receiving means comprise a plurality of sockets in said end shield, said free end portions extending at least partially into said sockets.

20. A dynamoelectric machine as set forth in claim 19, wherein said free end portions are predeterminately spaced from the side walls of said sockets thereby to form gaps therebetween which are generally filled by said metallic means.

21. A dynamoelectric machine as set forth in claim 19, wherein said receiving means portions comprise means for extending from the side walls of said sockets generally toward said free end portions, and means on the extending means for interconnecting engagement with said metallic means thereby to prevent displacement of said end shield from said beams.

22. A dynamoelectric machine as set forth in claim 21, wherein said free end portions include means for interconnecting engagement with said metallic means thereby to prevent displacement of said beams from said sockets.

23. A dynamoelectric machine as set forth in claim 22, wherein said interconnecting engagement comprises a shrink-fit of said metallic means with the interconnecting means of both said free end portions and said receiving means portions.

* * * * *